United States Patent Office 2,715,125

Patented Aug. 9, 1955

1

2,715,125

7-HYDROXYPROPYL THEOPHYLLINE DERIVATIVES AND PRODUCTION THEREOF

Robb V. Rice, Hasbrouck Heights, N. J., assignor to Gane's Chemical Works, Inc., Carlstadt, N. J., a corporation of New York No Drawing. Application March 20, 1953, Serial No. 343,787

8 Claims. (Cl. 260—256)

This invention pertains to new and improved theophylline derivatives and their preparation, which derivatives possess the valuable therapeutic properties of theophylline and the theophylline derivatives now most widely used, such as aminophylline and theophylline with sodium glycinate, and which are superior to these known products in being stable and neutral, as well as highly water soluble, and hence which are suitable for oral or parenteral administration.

The new theophylline derivatives of the invention, namely 7-beta-hydroxypropyl theophylline and 7-gamma-hydroxypropyl theophylline, have numerous outstanding advantages over theophylline and the theophylline preparations in common use, this being particularly true with reference to the preferred modification of the invention, namely, the 7-beta-hydroxypropyl derivative. These advantages are realized in the therapuetic applications of this new theophylline derivative and in the pharmaceutical compounding of preparations with properties impossible to obtain with known theophylline compounds.

One of the most outstanding advantages of 7-beta-hydroxypropyl theophylline is its ability to form highly concentrated aqueous solutions that are stable at room temperature and also at elevated temperatures that might be encountered in heat sterilization processes. Solutions of at least 50 per cent concentration in water can be prepared and these solutions are essentially neutral in reaction, having pH values within the range of 5.5 to 7.0.

The comparative solubilities of theophylline and some of its salts and derivatives are shown in the table. Solubilities are expressed as approximate volume of water in milliliters required to dissolve one gram of the theophylline preparation.

TABLE

| Composition | Milliliters of water to dissolve one gram |
|---|---|
| Theophylline | 120 |
| Theophylline and Sodium Acetate | 25 |
| Theophylline and Sodium Glycinate | 6 |
| Aminophylline | 5 |
| 7-Hydroxyethyl Theophylline | 10 |
| 7-Dihydroxypropyl Theophylline | 3 |
| 7-Beta-hydroxypropyl Theophylline | 1 |

Introduction of the dihydroxypropyl radical increases the solubility of theophylline by a factor of 40 while the beta-hydroxypropyl radical increases the solubility by a factor of 120. The pronounced higher solubility of beta-hydroxypropyl theophylline as compared to all the compounds listed in the table is clearly demonstrated.

The ability of 7-beta-hydroxypropyl theophylline to form highly concentrated, stable, and neutral aqueous solutions makes it superior to other theophylline preparations for a number of reasons. It provides a compound ideally suited for the preparation of solutions to be administered by hypodermic injection because the volume of solution to be injected can be small as compared to that required for less soluble preparations. The solutions can be sterilized without any possibility of decomposition or change in therapeutic properties occurring. The neutral character of the solutions materially reduces the chances of experiencing painful local irritation and tissue necrosis following hypodermic injection. The solutions obtained with 7-beta-hydroxypropyl theophylline in water may also be prepared in combination with other medicinal agents which are stable only in neutral solution. For example, water solutions containing strophanthin or rutin are stable where solutions of these same compounds with some of the other most commonly used theophylline compounds will decompose because of the strong alkaline reaction of the theophylline compound. Neutral aqueous solutions of 7-beta-hydroxypropyl theophylline can be conveniently administered by inhalation in the form of a spray produced by an atomizer or similar device. Many other theophylline preparations are not soluble enough or they are not tolerated by the body when administered in this way because of their strong alkaline reaction.

7-beta-hydroxypropyl theophylline is not precipitated from aqueous solution by acids or by gastric juice. Thus, when the preparation is administered by mouth, for example, in the form of tablets or capsules, it will dissolve in the gastric juice. This is an advantage over theophylline, aminophylline, theophylline and sodium acetate and other similar preparations because these preparations produce poorly soluble theophylline in the presence of the acidic contents of the stomach. The highly soluble 7-beta-hydroxypropyl theophylline is, therefore, more rapidly absorbed into the blood stream where it can produce the desired therapeutic responses.

The extremely high solubility of the 7-beta-hydroxypropyl theophylline of the present invention is quite unexpected in view of previously known facts. The previously known 7-hydroxyethyl theophylline is considerably more soluble in water than theophylline, concentrations of approximately ten per cent being possible. The previously known 7-dihydroxypropyl theophylline possesses an additional hydroxyl radical and an additional carbon atom in the side-chain that has been added to the theophylline molecule. It is decidedly more soluble in water than the hydroxyethyl compound, solutions of 30 to 35 per cent concentration being possible. It would be concluded from these facts that the introduction of a second hydroxyl radical in the side-chain added to the theophylline molecule is essential for increasing water solubility. It has been shown in the present invention that an even greater increase in water solubility over that of 7-hydroxyethyl- or 7-dihydroxypropyl theophylline can be attained by the introduction of a propyl radical having only one hydroxyl radical in the beta position.

I have found in accordance with my invention that the position of the hydroxyl radical in the propyl side-chain added to the theophylline nucleus is very important. Thus 7-gamma-hydroxypropyl theophylline, also a new compound prepared for the first time by me as described in the following examples, is found to require 6 ml. of water to dissolve one gram as compared to 1 ml. to dissolve 1 gram of beta-hydroxypropyl theophylline. Thus while the gamma-hydroxypropyl theophylline derivative of my invention has a much lower water-solubility than the preferred 7-beta-hydroxypropyl derivative, the water solubility of the former is nevertheless considerable and in addition it possesses the other advantages above mentioned of the latter compound in being stable and neutral, and hence suitable for both oral and parenteral administration.

A number of methods have been described for the preparation of 7-hydroxyalkyl derivatives of theophylline and the yields obtained have varied widely, depending upon the solvents used, the conditions used in carrying out the reaction, and the method of isolating the reaction products. I have developed a process for preparing 7-hydroxypropyl derivatives of theophylline that gives better yields of pure compounds than any method previously described for making 7-hydroxyalkyl theophylline compounds.

7-hydroxyalkyl theophylline compounds are prepared, in general, by the reaction between an alkali metal salt of theophylline and a halogenated monohydric or polyhydric alcohol. The reaction has been carried out without a solvent or in the presence of solvents of the nature of ethyl alcohol or water.

According to my preferred method of preparation, I use water as the solvent for the reaction. When water is used as the solvent, I have found that it is important to use an excess of halogenated alcohol and of alkali metal hydroxide of the order of five to fifty per cent of the amount calculated from the equation for the chemical reaction. According to this equation one mole of theophylline should require one mole of halogenated alcohol and one mole of alkali metal hydroxide. I have found, however, that in practice, some of the halogenated alcohol reacts directly with some of the alkali metal hydroxide instead of reacting with the alkali metal salt of theophylline. This leads to the presence of some unreacted theophylline in the final reaction mixture that is extremely difficult to remove. The presence of this unreacted theophylline has a pronounced depressant effect upon the melting point of the finished product and any attempt to remove it causes a large loss in yield.

The complicated purification process and the accompanying loss of yield can be avoided if the hydroxyalkylation of theophylline in an aqueous solvent is carried out according to my process. 7-hydroxyalkyl theophylline compounds obtained by my process can be purified by a single crystallization from an anhydrous alcohol, for example, ethyl alcohol, whereas, it is necessary to employ a minimum of three crystallizations from the same solvent if the hydroxyalkylation process is carried out with the exact calculated proportions of reactants.

According to my process, one molar equivalent of theophylline is treated with 1.05 to 1.50 molar equivalents of a halogenated alcohol and an amount of alkali metal hydroxide which is the molar equivalent of the halogenated alcohol used. The reactants are heated together in water as a solvent at a temperature between 50° C. and 110° C. until the halogenated alcohol has reacted completely, either with the alkali metal theophylline salt or with the alkali metal hydroxide. The water is completely removed from the reaction mixture by distillation under reduced pressure and the residue is extracted with a boiling anhydrous alcohol. The hot mixture is filtered to remove insoluble alkali metal halide and the hydroxyalkyl theophylline compound crystallizes upon cooling the filtrate. Purification of the crude product is accomplished by one crystallization from an anhydrous alcohol, for example, ethyl alcohol.

The following examples serve to illustrate some of the methods by which 7-hydroxypropyl theophylline compounds may be prepared:

*Preparation of 7-beta-hydroxypropyl theophylline*

EXAMPLE I

A mixture of 270 gm. (1.5 moles) of anhydrous theophylline and 213 gm. (2.25 moles) of 1-chloro-2-propanol in 750 cc. of water is heated to boiling in an apparatus equipped with a mechanical agitator, reflux condenser, thermometer, and dropping funnel. A 25 per cent solution of sodium hydroxide in water, containing 90 gm. (2.25 moles) of sodium hydroxide, is added to the refluxing mixture over a period of 2 hours. Refluxing is continued for one hour after all the sodium hydroxide has been added. The water is removed as completely as possible by distillation under reduced pressure, using a boiling water bath as the source of heat. The residue, consisting of a sticky, resinous mass or white solid, is treated with 700 cc. of anhydrous ethyl alcohol and heated until the remaining insoluble solid is loose and granular. The solid is separated by filtering the hot mixture. When the filtrate cools, a white, crystalline mass separates which is filtered off and washed with cold anhydrous ethyl alcohol. The material is purified by crystallization from anhydrous ethyl alcohol. The purified product is 7-beta-hydroxypropyl theophylline, M. P. 135–136° C. The pH of a 5 per cent solution in distilled water falls within the range of 5.5 to 7.0. One gram dissolves in approximately 1 cc. of water at 20° C. and in about 14 cc. of anhydrous ethyl alcohol. It is considerably more soluble in boiling anhydrous ethyl alcohol.

EXAMPLE II

A mixture of 180 grams (1.0 mole) of anhydrous theophylline and 105 gm. (1.10 moles) of 1-chloro-2-propanol in 500 cc. of water is heated to a reflux temperature (about 90° C.) in the apparatus described in Example I. A solution of 82.5 gm. (1.10 moles) of 85 per cent potassium hydroxide in 225 cc. of water is added from a dropping funnel over a period of 3 to 4 hours. After refluxing for an additional hour, the solution is evaporated under reduced pressure until all of the water is removed. 7-beta-hydroxypropyl theophylline is isolated and purified as described in Example I, M. P. 135–136° C.

EXAMPLE III

Two hundred and seventy grams (1.5 moles) of anhydrous theophylline are dissolved in one liter of water by heating the mixture to boiling. A solution of 60 gm. (1.5 moles) of sodium hydroxide in 180 cc. of water is added gradually during stirring. The solution that forms is treated with 142 gm. (1.5 moles) of 1-chloro-2-propanol which is added in small portions within a period of approximately ten minutes. The solution is refluxed for 4 hours and the water is completely removed by distillation under reduced pressure. The residue is extracted by boiling it with 700 cc. of anhydrous ethyl alcohol and filtering to remove sodium chloride. The product that crystallizes from the filtrate upon cooling is filtered by suction, washed with anhydrous ethyl alcohol and recrystallized from anhydrous ethyl alcohol, M. P. 125–128° C. Three additional crystallizations from ethyl alcohol were required to raise the melting point to 135–136° C. which is the melting point of the pure 7-beta-hydroxypropyl theophylline. The yield is approximately one-half that obtained by the preferred process.

EXAMPLE IV

A mixture of 135 gm. (0.75 mole) of anhydrous theophylline, 375 cc. of water, and 125 gm. (0.9 mole) of 1-bromo-2-propanol is heated to boiling in an apparatus equipped with a mechanical agitator and a reflux condenser. A solution of 36 gm. (0.9 mole) of sodium hydroxide in 90 cc. of water is added to the boiling solution over a period of 2 hours and refluxing is continued for one hour. The water is completely removed by evaporation under reduced pressure and the residue is extracted with boiling anhydrous isopropanol. The hot mixture is filtered to remove sodium bromide. The 7-beta-hydroxypropyl theophylline that crystallizes out on cooling is filtered by means of suction and purified by recrystallization from anhydrous isopropanol, M. P. 135–136° C.

*Preparation of 7-gamma-hydroxypropyl theophylline*

EXAMPLE V

A mixture of 135 gm. (0.75 mole) anhydrous theophylline, 375 cc. of water and 107 gm. (1.125 moles) 3-chloro-1-propanol is heated to boiling in an apparatus equipped with a mechanical agitator and reflux condenser.

The boiling solution is treated with a solution of 45 gm. (1.125 mole) sodium hydroxide in 90 cc. of water over a period of 3 hours. After refluxing for one hour, the water is removed by distillation under reduced pressure. The residue is extracted with 750 cc. of boiling anhydrous ethyl alcohol and the liquid is filtered to remove insoluble sodium chloride. The solid that crystallizes out on cooling is filtered by suction and washed with anhydrous ethyl alcohol. The product is 7-gamma-hydroxypropyl theophylline, M. P. 149–150° C. A five per cent solution has a pH within the range of 5.5 and 7.0. One gram is soluble in approximately 6 cc. of water at 20° C.

EXAMPLE VI

A solution is prepared by adding 135 gm. (0.75 mole) of anhydrous theophylline to 500 cc. of boiling water in an apparatus equipped with a mechanical agitator and a reflux condenser. This solution is treated with 30 gm. (0.75 mole) of sodium hydroxide dissolved in 90 cc. of water, then 71 gm. (0.75 mole) of 3-chloro-1-propanol is added in small portions during a period of approximately 15 minutes. The mixture is refluxed for 3 hours and the water is removed as completely as possible by means of distillation under reduced pressure. The residue consists of a solid, white lump of horn-like consistency. It is extracted with 750 cc. of boiling, anhydrous ethyl alcohol and filtered to remove sodium chloride. The solid that crystallizes from the filtrate on cooling is filtered by suction, washed with anhydrous ethyl alcohol and recrystallized from anhydrous ethyl alcohol, M. P. 142–144° C. Four additional crystallizations from anhydrous ethyl alcohol are required to purify the low melting 7-gamma-hydroxypropyl theophylline to raise the melting point to 149–150° C. The extensive purification procedure results in a loss of approximately 40 per cent of the original yield.

I claim:

1. The highly water soluble, stable and neutral derivatives of theophylline, suitable for oral and parenteral administration, having the following chemical structure:

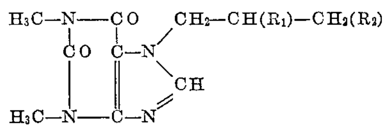

where $R_1$ and $R_2$ are radicals selected from the group consisting of —H and —OH, in which when $R_1$ is —H, $R_2$ is —OH and vice versa.

2. The highly water soluble, stable and neutral derivative of theophylline, suitable for oral and parenteral administration, having the following chemical structure:

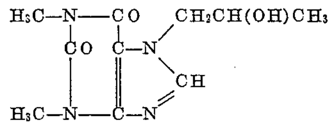

3. The highly water soluble, stable and neutral derivative of theophylline, suitable for oral and parenteral administration, having the following chemical structure:

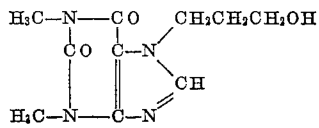

4. A process for the preparation of 7-hydroxy-propyl theophylline compounds which comprises treating one molar equivalent of theophylline with 1.05 to 1.50 molar equivalents of a monohalogenated propanol and 1.05 to 1.50 molar equivalents of an alkali metal hydroxide, using water as the solvent.

5. A process for the preparation of 7-hydroxy-propyl theophylline compounds which comprises treating one molar equivalent of theophylline with 1.05 to 1.50 molar equivalents of a monohalogenated propanol and 1.05 to 1.50 molar equivalents of an alkali metal hydroxide, using water as the solvent and operating within a temperature range of 50° and 100° C.

6. A process for the preparation of 7-hydroxy-propyl theophylline compounds which comprises treating one molar equivalent of theophylline with 1.05 to 1.50 molar equivalents of a monohalogenated propanol and 1.05 to 1.50 molar equivalents of an alkali metal hydroxide, using water as the solvent and operating within a temperature range of 50° and 110° C., followed by isolation of the reaction product by substantially complete removal of the water and treatment of the residue with a substantially anhydrous solvent comprising a monohydric alcohol of not less than two nor more than four carbon atoms.

7. A process for the preparation of 7-hydroxy-propyl theophylline compounds which comprises heating one molar equivalent of theophylline with 1.05 to 1.50 molar equivalents of a monohalogenated propanol in water, slowly adding with stirring and heating 1.05 to 1.50 molar equivalents of alkali metal hydroxide in aqueous solution, thereafter refluxing the mixture until all of the halogenated alcohol has reacted, removing the water in vacuo, treating the residue with a boiling anhydrous alcohol, filtering hot, cooling and again filtering, and washing with an anhydrous alcohol.

8. A process for the preparation of 7-hydroxy-propyl theophylline compounds which comprises heating one molar equivalent of theophylline with 1.05 to 1.50 molar equivalents of a monohalogenated propanol in water, slowly adding with stirring and heating 1.05 to 1.50 molar equivalents of alkali metal hydroxide in aqueous solution, thereafter refluxing the mixture until all of the halogenated alcohol has reacted, removing the water in vacuo, treating the residue with a boiling anhydrous alcohol, filtering hot, cooling and again filtering, washing with an anhydrous alcohol and recrystallizing from an anhydrous alcohol.

References Cited in the file of this patent

FOREIGN PATENTS

| | | |
|---|---|---|
| 4,250 | Great Britain | of 1907 |
| 191,106 | Germany | Aug. 9, 1906 |

OTHER REFERENCES

Rejohn et al., Arch. Pharm. 268, 567–572 (1930).